United States Patent
Mallick

(10) Patent No.: US 7,280,072 B2
(45) Date of Patent: Oct. 9, 2007

(54) SYSTEM FOR THE RELATIVE NAVIGATION OF AIRCRAFT AND SPACECRAFT USING A PHASED ARRAY ANTENNA

(76) Inventor: Brian Mallick, 15506 Ripplewind La., Houston, TX (US) 77068

( * ) Notice: Subject to any disclaimer, the term of this patent is extended or adjusted under 35 U.S.C. 154(b) by 303 days.

(21) Appl. No.: 11/104,851

(22) Filed: Apr. 13, 2005

(65) Prior Publication Data

US 2006/0232470 A1 Oct. 19, 2006

(51) Int. Cl.
*G01S 1/08* (2006.01)
(52) U.S. Cl. .................... 342/386; 342/146
(58) Field of Classification Search ............. 342/146, 342/386, 417, 436, 443; 701/207
See application file for complete search history.

(56) References Cited

U.S. PATENT DOCUMENTS

| | | | | |
|---|---|---|---|---|
| 3,099,006 A | * | 7/1963 | De Rosa | 342/404 |
| 3,274,592 A | * | 9/1966 | Crane | 342/155 |
| 3,790,943 A | * | 2/1974 | Pickles et al. | 342/399 |
| 3,950,753 A | * | 4/1976 | Chisholm | 342/399 |
| 4,071,847 A | * | 1/1978 | Pickles | 343/761 |
| 4,788,548 A | * | 11/1988 | Hammerquist | 342/458 |
| 4,823,137 A | * | 4/1989 | Mallick | 342/457 |
| 5,915,278 A | * | 6/1999 | Mallick | 73/658 |
| 2005/0168381 A1 | * | 8/2005 | Stephens | 342/146 |

* cited by examiner

*Primary Examiner*—Dao L. Phan

(74) *Attorney, Agent, or Firm*—Clarence E. Eriken

(57) ABSTRACT

A system for the relative navigation of aircraft and spacecraft is disclosed which uses a series of short duration, unmodulated radio pulses transmitted from a phased array antenna. The aircraft or spacecraft whose position is to be determined from another is called as the local station, whereas the other craft with the phased array antenna system is called as the transmitting station. The local station transmits a radio query pulse to the transmitting station. In response to the radio query pulse, the transmitting station transmits a series of unmodulated radio pulses, where each radio pulse is transmitted with a three dimensional radiation pattern that is different than the three dimensional radiation patterns of the other radio pulses transmitted by the transmitting station. A receiver attached to the local station aircraft or spacecraft receives each radio pulse, generates a signal that describes the radio signal strength of the received signal and sends that signal strength number to a stored program processor which stores that signal strength number into memory. After a series of radio signals are received at the local station and at least two radio signal strength measurements are stored in memory, the stored program processor calculates the power ratio or ratios of each received radio signal strength from each radio pulse transmitted by the transmitting location. Bearing is then determined by comparing the calculated radio signal power ratios with a library of angles that correspond to specific power ratios for all radio radiation patterns transmitted. The local station also records the time elapsed from when the first radio pulse is received from the transmitting station after the radio query pulse is sent. Range is determined by dividing that elapsed time by two and multiplying that time with the speed of light.

5 Claims, 3 Drawing Sheets

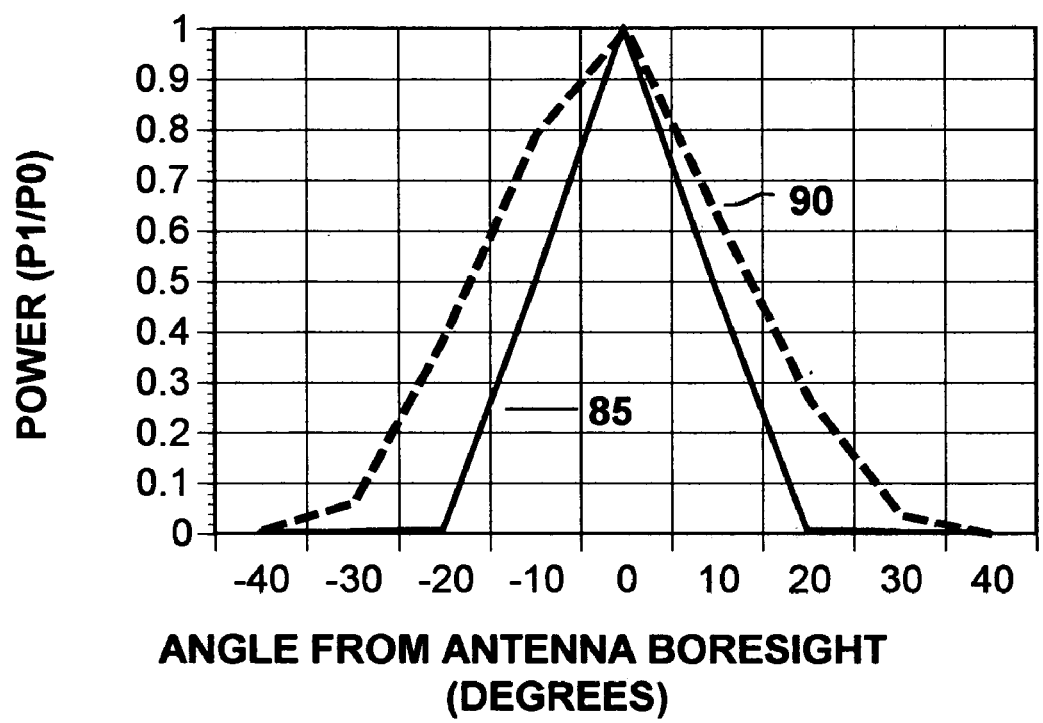

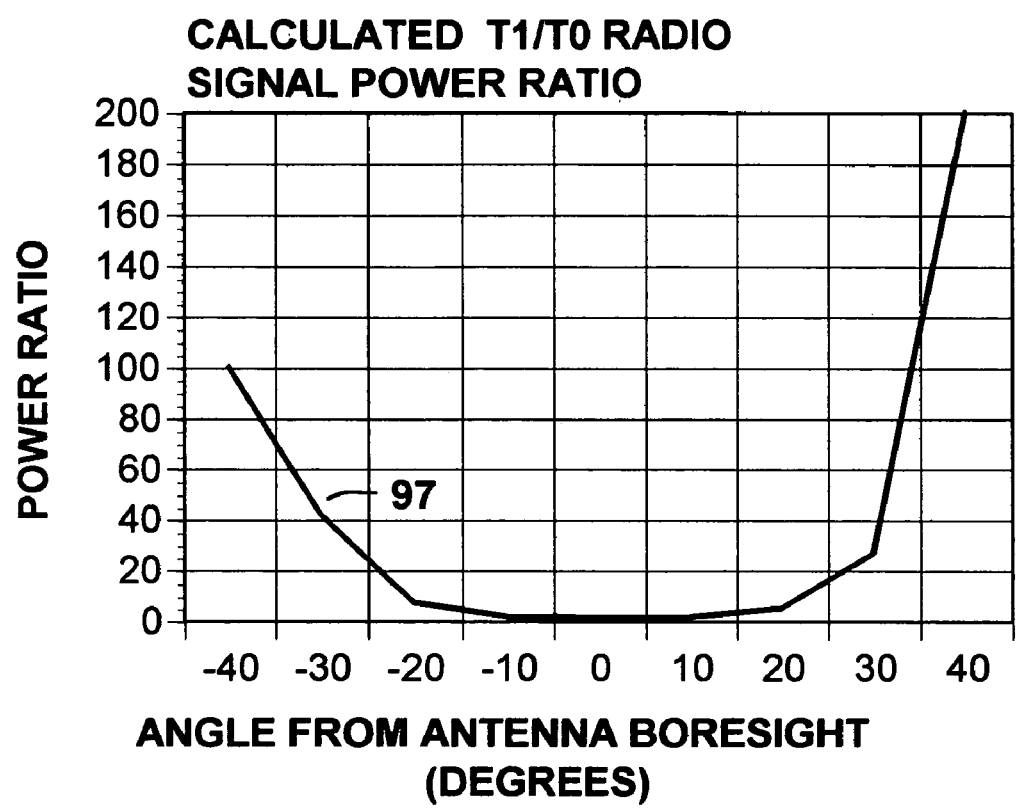

SYSTEM FOR THE RELATIVE NAVIGATION OF AIRCRAFT AND SPACECRAFT USING A PHASED ARRAY ANTENNA

BACKGROUND OF THE INVENTION

1. Field of the Invention

This invention relates to a navigational system for determining the bearing and distance of one aircraft or spacecraft with respect to another, the two objects being above ground in the Earth's atmosphere or in outer space. It more particularly relates to a radio navigation system using a set of pulses of unmodulated radio beacons of a specific frequency transmitted from a phased array antenna.

2. Description of the Prior Art

U.S. Pat. No. 4,823,137 to Mallick describes a navigational system using an array of fixed, directional antennas for broadcasting unmodulated radio signals at several different frequencies. Each antenna is conductively coupled to a transmitter that provides the unmodulated radio signal to the antenna, and each antenna transmits a radio signal of a different frequency from the frequencies of transmission of other antennas in the array. Since each antenna is pointing in a different direction from other antennas in the array, each antenna's radio signal radiation pattern will vary with angle. The bearing of the antenna array is calculated by using an array of receivers, where each receiver is tuned to a frequency identical to the frequency of each transmitting antenna. Each receiver receiving the unmodulated radio signal for each frequency measures the received signal power for each frequency and calculates the received power ratios for all signals. Calculated power ratios are then compared to a library of power ratios and their corresponding angles with respect to the transmitting array to determine the bearing of the receiver with respect to the transmitting array. Range is calculated by comparing the received power of the radio signals with the known transmitted power. Using the equation defining the inverse power law can determine the distance between the transmitting array and the receivers. Another way distance is determined is by having the receiver array send out a query pulse that triggers the antenna array to transmit their signals and measuring the time that the signals are received from the time that the query pulse is transmitted. Dividing the elapsed time by two and multiplying that time with the speed of light will determine the distance between the transmitting antennas in the receiver array.

U.S. Pat. No. 5,915,278 to Mallick describes a navigational system using a flat-panel array of microstrip antenna elements to transmit the unmodulated radio signals instead of using a set of directional antennas. Each element on the flat-panel array is conductively coupled to a transmitter that causes the microstrip antenna to transmit an unmodulated radio signal having a different frequency and a different radiation pattern from the other microstrip antennas in the array. The different radiation patterns can be created by using different antenna geometries, putting dielectric lens over some antennas, or by introducing a slight tilt of the antennas on the panel with respect to the other antennas on the array. Since each antenna produces a different radiation pattern with respect to any other antennas in the array, each radio signal received by a receiver array some distance from the transmitting array has a different signal power. Bearing can be calculated by calculating the ratios of each signal power of each frequency and comparing them to a library of power ratios as a function of frequency. The corresponding angle to each power ratio in the library will determine the bearing. Range is calculated by methods similar to that in U.S. Pat. No. 4,823,137.

U.S. Pat. Nos. 4,823,137 and 5,915,278 to Mallick describe navigational system utilizing several radio frequencies which require a plurality of radio signal transmitters and an array of receivers. However, in many aircraft and spacecraft there are size and weight limitations that require that a simple and more compact electronic system be used. A system that can determine bearing and range from a single radio frequency could conform to the aforementioned size and weight limitations.

Other known existing radio navigation devices transmit either a rotating and/or modulating radio beacon. Rotating the radio beacon is disadvantageous because the navigational signal is transmitted to only a small volume of space at any one time. Modulating the radio beacon is disadvantageous because the time consumed in modulating and demodulating the signal limits the repeat transmission rate of the navigational signal. Systems that utilize unmodulated radio beacons of different frequencies require several radio sources of different frequencies and several receivers to receive the unmodulated signals. This is disadvantageous because it requires more equipment than utilizing just a single frequency.

U.S. Pat. No. 4,017,860 to Earp teaches using a fixed planar matrix of antennas with programmed excitation to produce a moving pencil beam of radiation. This produces an artificial Doppler signal component as observed at a remote receiving station. Navigational information is derived from the signal by using the principle that the Doppler shift in frequency is proportional to the cosine of the angle which a radio receiver of the system subtends with respect to the line of movement of the source.

SUMMARY OF THE INVENTION

In accordance with the present invention, a radio navigation system and a method of operating such a system are provided. A radio navigation system according to the present invention uses unmodulated radio signals of a single frequency that are transmitted as a series of radio pulses. The transmitting array is a radio phased array antenna panel that is common to military and airport radar systems. The radio receiver that receives the signals from the phased array antenna panel is tuned to the frequency of the radio signals and measures the power of the received radio signal. Thus the amount of the electronic equipment employed is less than that described in the known related art.

A radio navigation system according to the present invention uses a series of pulses of unmodulated radio beams of a single frequency that are transmitted from the phased array panel. Each pulse is transmitted at a specific time and is transmitted for a specific duration. Each of the pulses will have a different radiation pattern from the other patterns. At the receiver location the radio signal is received and the signal power is measured. The signal power measurement is stored in memory by a stored program processor in a computer and then another signal is received by the receiver. After a series of signals are received and at least two signal strength measurements are stored in memory, the stored program processor calculates the ratio or ratios of each signal strength per time interval. Bearing is then determined by comparing the calculated signal power ratios with a library of angles that correspond to specific signal power ratios. Range is determined by either measuring the signal round-trip travel time after a query signal is sent from the receiver location, or by comparing the received power ratios with what the power ratio would be from the transmitting location using the inverse square law equation that defines power dissipation with distance.

BRIEF DESCRIPTION OF THE DRAWINGS

The invention will further be described by reference to the accompanying drawings which illustrate a particular embodiment of a relative navigation system for aircraft or spacecraft using a phased array antenna in accordance with the present invention, wherein like members bear like reference numerals and wherein:

FIG. 2 is a graph showing two-dimensional cross-sections of three-dimensional radio radiation patterns for two subsequent radio pulses as functions of angle according to the present invention.

FIG. 3 is a graph of the calculated received radio signal power ratios for all possible angles for two sequential received radio signals at the local station according to the present invention.

DESCRIPTION OF SPECIFIC EMBODIMENTS

Figure 1A:
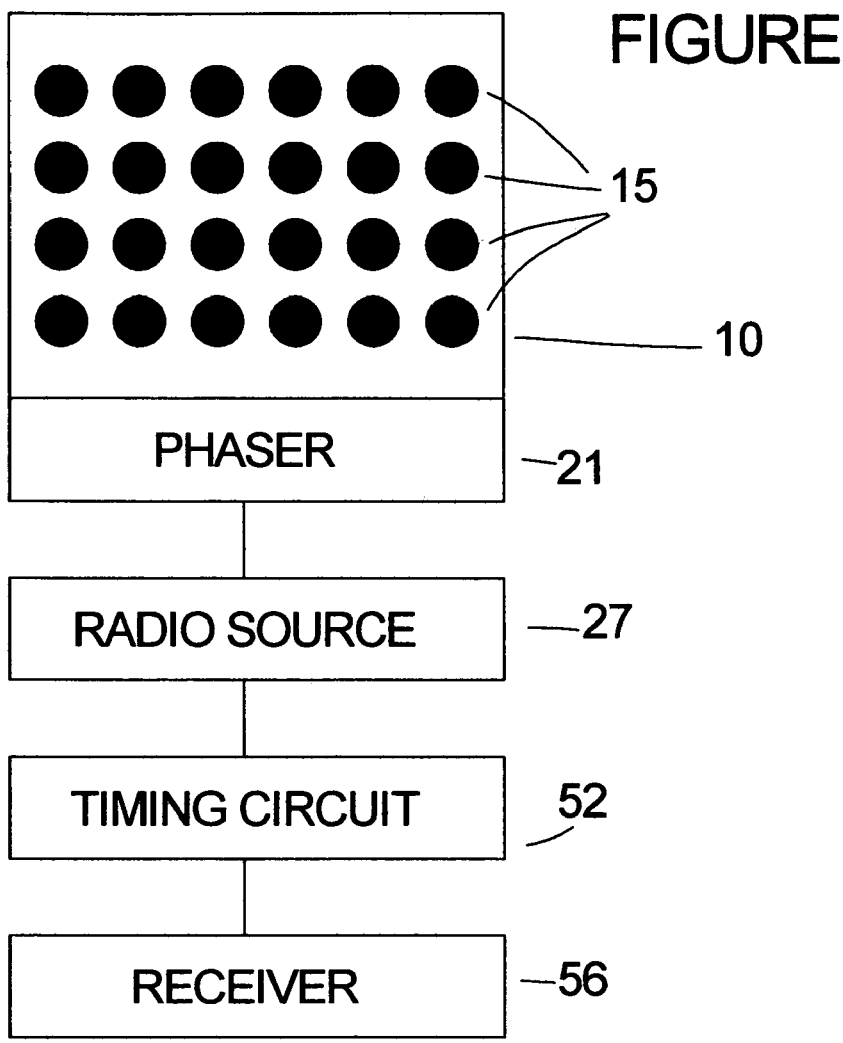
FIG. 1A is a schematic diagram in block diagram form of the transmitting station containing the phased array antenna according to the present invention.

Referring to the FIG. 1A, a phased array panel 10 at a transmitting station has a plurality of circular microstrip antennas 15 on it. Each microstrip antenna 15 is conductively connected to the phaser circuitry 21 that controls the time that the radio signal from the radio source 27 is received by each antenna element 15 for transmission. This time difference affects the phase for each antenna signal and hence the directionality of the combined signal from all antennas. Attached to the radio signal source 27 is a computer-controlled timing circuit 52 that energizes the array. Attached to the timing circuit 52 is a receiver 56 that receives a query pulse.

In one embodiment, phased array antenna panel 10 comprises 24 circular microstrip antennas 15 in a four row by six column array. A radio navigation system in accordance with the present invention may work with as few as four microstrip antenna elements; however, the more microstrip antenna elements there are in the phased array antenna results in better beam shaping and more accurate bearing determination.

Figure 1B:
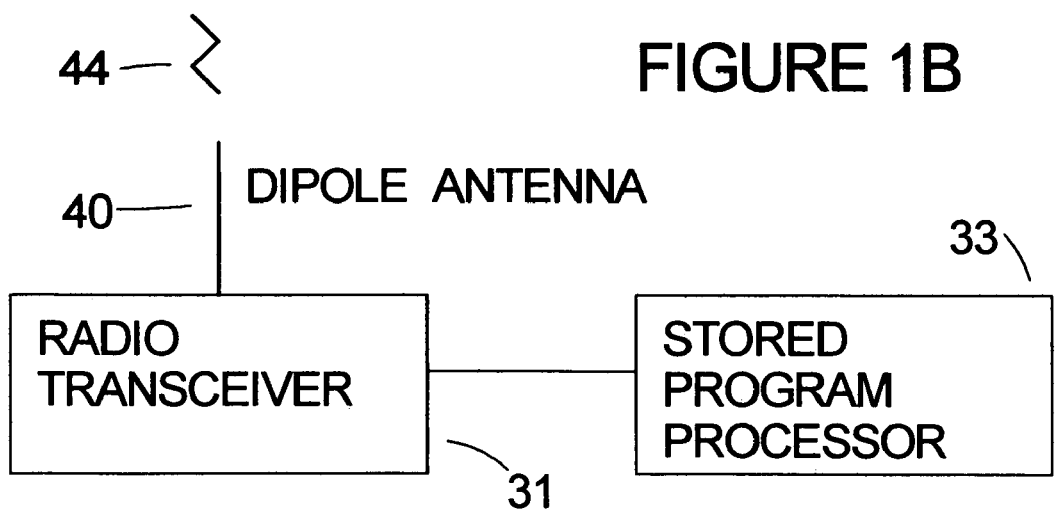
FIG. 1B is a schematic diagram in block diagram form of a local station according to the present invention.

Referring to FIG. 1B, a local station comprises radio transceiver 31 and its antenna 40 connected to a stored program processor 33. A radio transceiver is an electronic device comprising both a radio transmitter and a radio receiver. This local station is at some distance away from the phased array panel 10 of FIG. 1A. The purpose of the radio transceiver 31 is to transmit a query pulse that will initiate the operation of the radio equipment at the transmitting station shown in FIG. 1A, and to receive the radio signals that will be used to determine the location of the phased array panel relative to the local station. The radio transceiver 31 may contain an amplifier to amplify the received radio signals.

In operation, the radio transceiver 31 emits an unidirectional radio signal 44 from antenna 40 which may, for example, be a dipole antenna. The stored program processor 33 records the time that the query signal is sent and awaits the signal from the phased array panel 10. The receiver 56 receives the query signal 44, and then sends a signal to the timing circuit 52. Timing circuit 52 then energizes the radio source 27 to emit a series of radio pulses, where all pulses have the same frequency and where each pulse is transmitted at a specific time with a specific duration. At the same time the timing circuit 52 sends a signal to the phaser 21 which controls the radiation pattern transmitted at each specific time for each pulse in the series of radio pulses. The phaser controls each radio pulse's radiation pattern by controlling the number of antenna elements that receive the radio signal to be transmitted, or by selectively delaying the radio signal from the radio source 27 to each antenna element. The operation of the phaser 21 is common to most phased array antenna systems and is well known to those skilled in the art.

At the first transmission time, T0, the sixteen central microstrip antenna elements on the phased array antenna panel 10 are energized simultaneously such that a radio signal with a single frequency with a symmetrical radiation pattern around the boresight of the antenna is transmitted. The antenna boresight is the direction that the phased array antenna is pointing. The symmetrical radio pulse is transmitted for 25 microseconds. Seventy five microseconds later at time T1 another radio pulse is generated by the phased array antenna panel such that the time interval between T0 and T1 is 100 microseconds. At T1 the phaser circuitry 21 only allows the first and fourth antenna elements on the first column to be energized as well as the second element on the second column, the first and fourth elements on the third column, the first, second and fourth antenna elements on the fourth column, the third element on the fifth column, and the first, second and fourth antenna elements on the sixth column. Thus, at time T1 there will be twelve antenna elements that are energized. This will result in a radio pulse to be emitted with a broader beamwidth in its radiation pattern relative to the same array with all of the antenna elements energized. In general, the more antenna elements in an array that transmit a signal, the narrower the beamwidth will be of that signal.

At time T2 which is 100 microseconds later than time T1 the phaser circuit 21 allows all of the microstrip antenna elements in the first three columns and only half of the elements in the fourth, fifth and sixth columns to be energized. These antenna elements emit an unmodulated radio beam that is asymmetric around the boresight of the phased array antenna panel and this radiation pattern will be different than the radiation patterns of the radio signals transmitted at times T0 and T1.

The radio transceiver 31 receives the signal that was transmitted from the phased array antenna at time T0 and a signal is sent to the stored program processor 33 which records into memory the time that the signal from the phased array antenna was received. This signal will be used to calculate that distance of the transmitter array from the receiver location. The radio transceiver 31 also contains electronic circuitry that measures the power of the signal received from the phased array antenna panel 21 which was transmitted at time T0 and sends a number describing the power to the stored program processor 33 which stores that number into memory. The radio transceiver 31 receives the signal from the radio pulse transmitted by the phased array antenna at time T1, measures the power of the received radio signal and then sends a number describing the received signal power to the stored program processor 33 which stores that number into memory. Next the radio transceiver 31 receives the signal from the radio pulse transmitted by the phased array antenna at time T2, measures the power of the received radio signal and then sends a number describing the received signal power to the stored program processor which stores that number into memory.

In operation, the stored program processor 33 subtracts the time that the query pulse was sent from the time that the first signal was received at the receiver location to determine the round-trip transit time of the signals. The stored program processor 33 then divides that round-trip transit time by two and then multiplies that time by the speed of light to get the distance of the phased array antenna panel 21 from the receiver location. The stored program 33 processor then takes the number describing the radio signal power received at time T1 and divides it by the number that describes the radio signal power received at time T0 to get a received radio power ratio R1. The stored program processor 33 then takes the number describing the radio signal power received at time T2 and divides it by the number that describes the radio signal power received at time T0 to get a received radio power ratio R2.

The stored program processor 33 will have in its memory the three dimensional radiation patterns for each radio signal pulse transmitted by the phased array antenna 21 as well as the sequence of the radio signal radiation patterns. The stored program processor also has in its memory a three dimensional map of all of the possible received radio signal power ratios for T1/T0 and T2/T0. For each mapped radio signal power ratio in memory there will be a corresponding angle value that describes the location of the local station from the transmitting station. The stored program processor will determine the bearing of the local station relative to the transmitting station by either finding the mapped power ratio in memory that comes closest to the calculated power ratio and then using the corresponding angle value, or the stored program processor will find the two closest mapped power ratios in memory and their corresponding angle values and then interpolate between all values to generate the bearing angle.

FIG. 2 shows a two dimensional cross-section of the three dimensional radio radiation pattern received at the local station for one embodiment of the invention. The inner curve 85 is the symmetrical radio radiation pattern transmitted by the phased array antenna 10 at time T0 and the outer curve 90 is an asymmetric radio radiation pattern transmitted by the phased array antenna at time T1. The power values in FIG. 2 are expressed as ratios of the received power at any angle (P1) divided by the received power at zero degrees (P0). In one embodiment, sidelobe power values emitted by the phased array antenna 21 are very low (below −10 db) and can be ignored in the calculations of the received radio power values. The stored program processor 33 has stored the radio signal strength value of 0.056 watts for the radio signal received from the time T0 transmission from the phased array antenna 22. The stored program processor 33 has also stored the radio signal strength value of 0.269 watts for the radio signal received from the time T1 transmission from the phased array antenna. The stored program processor 33 divides the value 0.269 by 0.056 to calculate the ratio R1 of 4.80 which is the ratio of the received power values at times T0 and T1.

Referring to FIG. 3 which shows the ratios of all of the possible received radio strength values from time T1 divided by all of the possible received radio strength values received at time T0 as a function of angle that correspond to the two-dimensional cross-section of the received radio radiation patterns shown in FIG. 2. The stored program processor uses this ratio curve 97 and determines that the ratio R1 of 4.80 corresponds to an angle of +20 degrees which indicates that the local station is tilted 20 degrees right of the boresight of the transmitting location. If the received radio signal power ratio is equal to 1, then the received radio signal power ratio curve 97 would indicate that the local station is aligned perpendicular to the phased array antenna panel such that the deviation angle from the boresight of the phased array antenna is zero degrees.

The stored program processor 33 then calculates the received radio signal power ratio R2 by dividing the received radio strength value received at time T2 by the received radio strength value received at time T0. The stored program processor then searches the library of received radio signal power ratios derived from the radiation patterns of the radio signals transmitted at times T0 and T2 and determines that the local station is 10 degrees south of the transmitting station. Therefore, the total bearing of the local station from the transmitting station determined from the received radio signal strength values at times T0, T1 and T2 is 10 degrees from north of the transmitting station and tilted 20 degrees right.

Ideally the received radio signal strength power ratios for all radio radiation patterns would be unique for all angles in three dimensional space above the phased array antenna 21. If not, the phased array antenna 21 can transmit several more radio signal pulses with different radiation patterns such that each angle in three dimensional space will have at least one unique radio signal power ratio for any two radio radiation patterns used to compute the radio power ratio.

The received radio signal strength value for any one radio pulse is useless by itself to determine bearing because of the radio signal power dissipation with distance as defined by the inverse square power law:

$$D = W/(4\pi Z), \text{ where } Z = \sqrt{(Pr/PtGtGr)}.$$

Where D is distance from the transmitting phased array antenna, W is the radio signal wavelength, Pr is the power of the received radio signal, Pt is the power of the transmitted radio signal, Gt is the transmitting antenna gain, and Gr is the receiving antenna gain. Using the ratio of two received radio signal strength values negates the problem of radio signal strength dissipation with distance.

In one embodiment, a radio navigation system according to the present invention operated within a 30 degree angle in all directions from the boresight of the phased array antenna. If the local station is at an angle greater than thirty degrees in any direction from the transmitting station, then the transmitting station can use the scanning abilities of the phased array antenna to direct the radio beam at an angle grater than zero in any direction away from the boresight of the phased array antenna. In the description of the preferred embodiment where the tilt angle was determined to be 20 degrees, if the radio beams used in the angle determination were transmitted at an angle of 25 degrees from the boresight of the phased array antenna instead of zero degrees then the true angle would be 20 degrees plus 25 degrees equals 45 degrees.

Another embodiment of this invention would not utilize a query pulse to calculate distance. The phased array antenna system thus would not need a receiver to receive the query pulse. If the power of the emitted signals from the phased array antenna panel is known, then the distance can be calculated using the inverse square power law:

$$D = W/(4\pi Z), \text{ where } Z = \sqrt{(Pr/PtGtGr)}.$$

The phased array antenna would emit its series of pulses at a regular time interval, for example, every two seconds.

In still another embodiment of this invention the unmodulated radio signal's beamwidth is controlled by changing the time of each signal that is transmitted from each element of the phased array antenna such that all of the signals interfere constructively and destructively.

In another embodiment of this invention other kinds of antennas are used in the phased array antenna. Instead of microstrip antennas, slot antennas, horn antennas, stripline antennas or metallic rod antennas are used.

The principles and modes of operation of some embodiments of the present invention have been described in the foregoing specification. The present invention is not to be construed as limited to the particular forms disclosed, since these are regarded as illustrative rather than restrictive. Moreover, variations and changes may be made by those skilled in the art without departing from the spirit of the present invention.

What is claimed is:

1. A radio navigation system comprising:
   a. a transmitting station comprising: (i.) an array of antennas that transmit a series of radio pulses comprising unmodulated radio signals with different radiation patterns, each pulse's radiation pattern being determined by its sequence in a predetermined set of radiation patterns for each radio pulse transmitted, where each radio pulse is transmitted at a known time interval from the start of the series of radio pulses that are transmitted; and
   b. a local station comprising: (i.) a local receiver for receiving the radio navigation pulses transmitted from the transmitting station, and for generating a signal strength indication signal for each pulse in the series of pulses received; (ii.) a stored program processor for receiving the signal strength indication signal for each radio pulse received at each time interval for calculating the bearing of the local station from the central station.

2. The system of claim 1 wherein the stored program processor calculates bearing by receiving the signal strength indication signal for each radio received at each time interval, calculating the ratios of the received signal strength signals, and comparing said signal strength ratios to a library of ratios as functions of angle in memory that matches the predetermined pattern of radiation patterns transmitted by the transmitting station.

3. The radio navigation system of claim 1, wherein the array of radio antennas in the transmitting station is a phased array radio antenna.

4. A method of calculating the bearing of a local station from a transmitting station comprising:
   a. transmitting a series of radio pulses from the transmitting station comprising unmodulated radio signals with different radiation patterns using an array of antennas, where each pulse's radiation pattern is determined by its sequence in a predetermined set of radiation patterns for each radio pulse transmitted and where each radio pulse is transmitted at a known time interval from the start of the series of radio pulses that are transmitted; and
   b. receiving the radio navigation pulses at the local station and generating a signal strength indication signal for each pulse in the series of pulses received; and
   c. calculating the bearing of the local station from the central station using the signal strength indication signal.

5. The method of claim 4 wherein the calculating step comprises generating a signal strength indication signal for each pulse in memory, calculating the ratios of the received signal strength signals, and comparing said signal strength ratios to a library of ratios as functions of angle in memory that matches the predetermined pattern of radiation patterns transmitted by the central station.

* * * * *